United States Patent
Jang et al.

(10) Patent No.: US 10,650,778 B2
(45) Date of Patent: May 12, 2020

(54) PROCESSING IMAGE RESOLUTION

(71) Applicant: LG ELECTRONICS INC., Seoul (KR)

(72) Inventors: Kyounghoon Jang, Seoul (KR); Byungtae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/031,367

(22) Filed: Jul. 10, 2018

(65) Prior Publication Data

US 2019/0279595 A1    Sep. 12, 2019

(30) Foreign Application Priority Data

Mar. 8, 2018 (KR) ........................ 10-2018-0027669

(51) Int. Cl.
*G09G 5/00* (2006.01)
*G06T 3/40* (2006.01)
*G09G 3/20* (2006.01)
*G09G 5/391* (2006.01)

(52) U.S. Cl.
CPC ............ *G09G 5/005* (2013.01); *G06T 3/40* (2013.01); *G09G 3/20* (2013.01); *G09G 5/391* (2013.01); *G09G 2340/04* (2013.01); *G09G 2340/0407* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 9,350,904 B2 | 5/2016 | Takahashi | |
| 2003/0190092 A1* | 10/2003 | Dyas | G06T 3/4007 382/298 |
| 2011/0096228 A1 | 4/2011 | Deigmoeller et al. | |
| 2013/0223764 A1* | 8/2013 | Tripathi | G06T 3/4007 382/298 |
| 2014/0193094 A1 | 7/2014 | Shin et al. | |
| 2016/0295158 A1* | 10/2016 | Van Belle | G06T 3/4007 |

FOREIGN PATENT DOCUMENTS

| | | |
|---|---|---|
| JP | 2006-005524 | 1/2006 |
| KR | 10-2004-0022737 | 3/2004 |
| KR | 10-2011-0018294 | 2/2011 |

OTHER PUBLICATIONS

International Search Report dated May 16, 2019 issued in Application PCT/KR2019/000848.

* cited by examiner

*Primary Examiner* — Vu Nguyen
(74) *Attorney, Agent, or Firm* — KED & Associates LLP

(57) ABSTRACT

A display device according to an embodiment of the present invention may process an input image with higher resolution than allowed easily without reconfiguring a hardware system through an image processing unit which divides input image data with first resolution into image blocks of an acceptable size and generating processed image data with second resolution lower than the first resolution.

17 Claims, 13 Drawing Sheets

(a)

(b)

PROCESSING IMAGE RESOLUTION

CROSS-REFERENCE TO RELATED APPLICATION

Pursuant to 35 U.S.C § 119(a), this application claims the benefit of earlier filing date and right of priority to Korean Patent Application No. 10-2018-0027669 filed on Mar. 8, 2018, the contents of which are hereby incorporated by reference in its entirety.

BACKGROUND

1. Field

The present invention relates to a display device capable of processing an input image with resolution higher than allowed and an image processing method of the display device.

2. Background

Display devices are made of Liquid Crystal Displays (LCDs), Plasma Display Panels (PDPs), or Organic Light Emitting Diodes (OLEDs).

The high resolution display market is expanding along with advances in manufacturing technology for display devices and driving circuit technology. To realize high quality images, display devices featured by high resolution, extended color depth, high speed driving, and the like are being developed. The high resolution display devices on the market may exhibit Full High Definition (FHD) resolution which supports high definition input images of 1920 by 1080 pixels or Ultra High Definition (UHD) resolution supporting ultra high definition input images of 3840 by 2160 pixels.

BRIEF DESCRIPTION OF THE DRAWINGS

Arrangements and embodiments may be described in detail with reference to the following drawings in which like reference numerals refer to like elements and wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Examples of display devices according to the present invention include TVs, smart TVs, network TVs, Hybrid Broadcast Broadband Televisions (HBBTVs), Internet TVs, web TVs, Internet Protocol Televisions (IPTVs), digital signage, desktop computers, mobile phones, smart phones, laptop computers, digital broadcast terminals, Personal Digital Assistants (PDAs), Portable Multimedia Players (PMPs), navigations, slate PCs, tablet PCs, ultrabooks, and wearable devices. Examples of wearable devices include smart watches, smart glasses, and Head Mounted Displays (HMDs). The display device may be implemented by using PDP, LCD, OLED, Quantum Dot (QD), or QD LED display.

Figure 1:
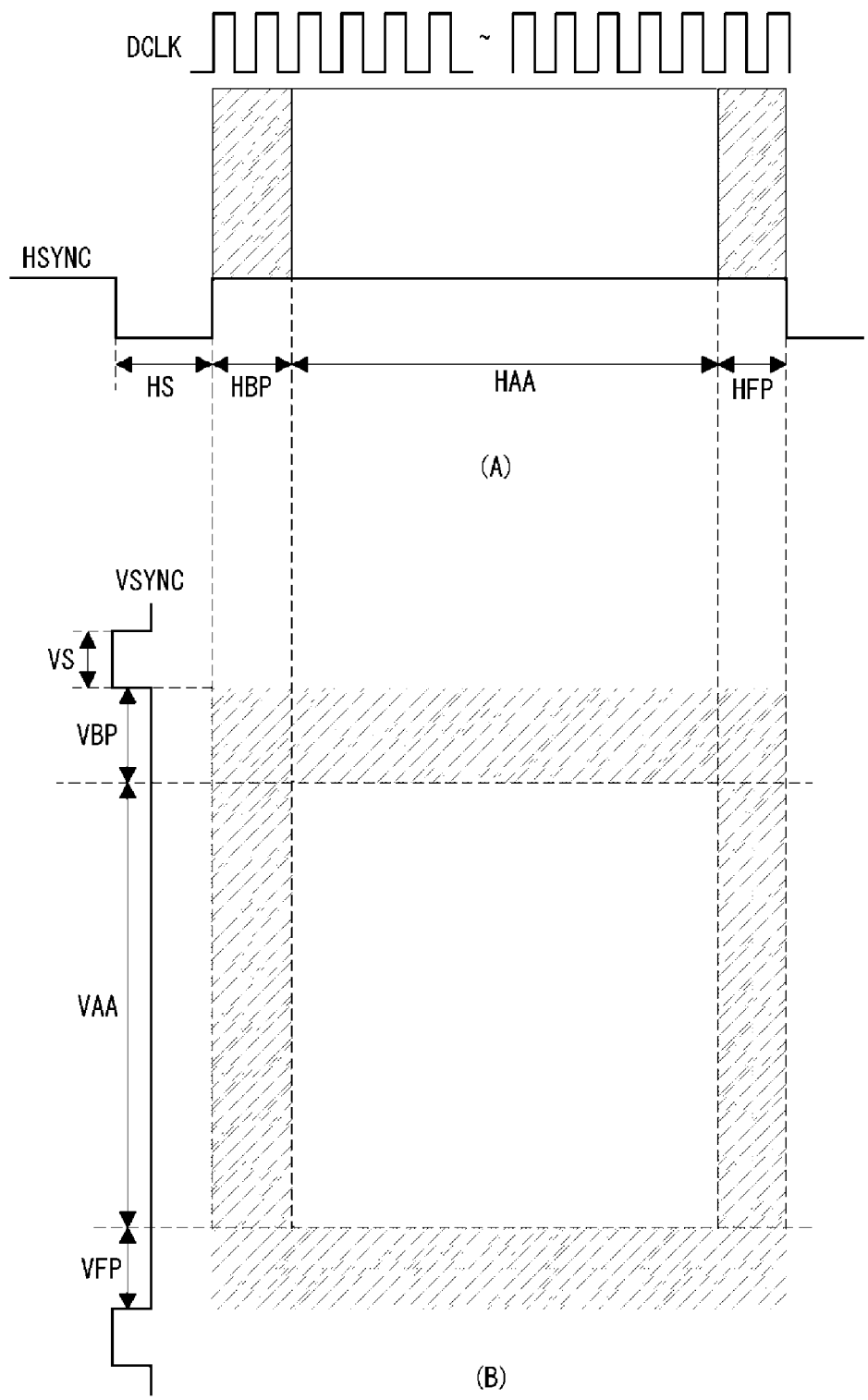
FIG. 1 shows an input vertical synchronization signal and an input horizontal synchronization signal synchronized with an input video clock.

A display device receives digital input image data from an external image source according to an input video clock. The input video clock (DCLK) may be synchronized with an input vertical synchronization signal (VSYNC) and input horizontal synchronization signal (HSYNC) as shown in FIG. 1.

As shown in FIG. 1(A), the input horizontal synchronization signal (HSYNC) includes a horizontal active area (HAA) in which actual image data is transmitted and a horizontal blanking interval in which no actual image data is transmitted. The horizontal blanking interval may include a horizontal front porch (HFP) and a horizontal back porch (HBP) before and after a horizontal synchronization (HS) interval, respectively.

As shown in FIG. 1(B), the input vertical synchronization (VSYNC) signal includes a vertical active area (VAA) in which actual image data is transmitted and a vertical blanking interval in which no actual image data is transmitted. The vertical blanking interval may include a vertical front porch (VFP) and a vertical back porch (VBP) before and after a vertical synchronization (VS) interval, respectively.

Frequency of the input video clock (DCLK) is increased in proportion to the resolution of an input image. A display device requires an internal clock faster than the input video clock (DCLK) and a large capacity memory to process high resolution input image data without loss. In particular, to process 8K ultra high definition input images which currently receive great attention, the hardware manufacturing process for display devices has to be more precise than now and hardware capacity has to be increased. In this case, the overall cost and time for reconfiguring the hardware manufacturing process for display devices may be increased.

Therefore, in the embodiment below, a method for processing an input image with resolution larger than that allowed for a display device without increasing a reference clock (internal clock) and/or memory capacity of the display device will be described.

Figure 2:
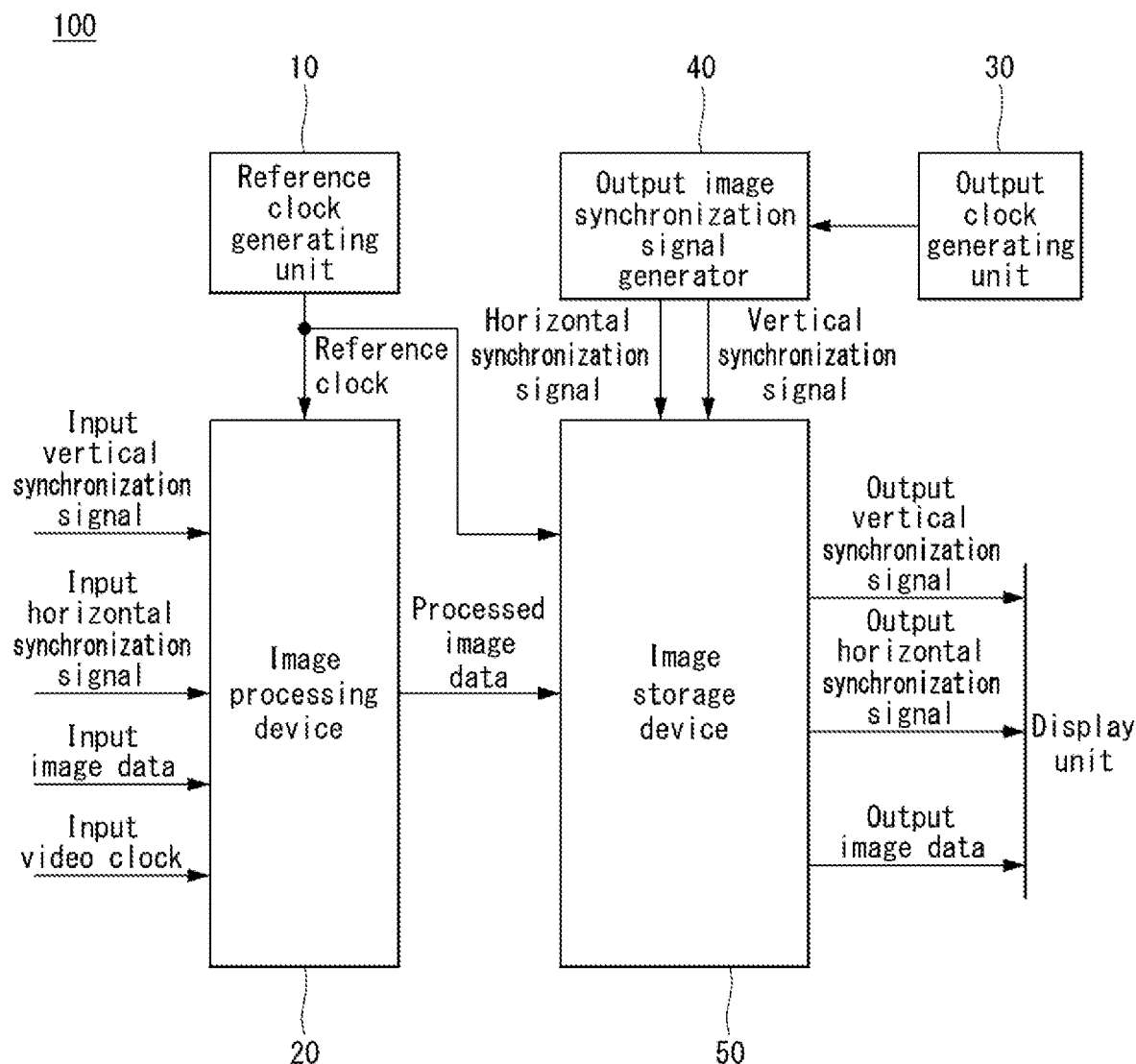
FIG. 2 illustrates an image processing device included in a display device according to an embodiment of the present invention.

FIG. 2 illustrates an image processing device included in a display device according to an embodiment of the present invention.

Referring to FIG. 2, an image processing device 100 according to an embodiment of the present invention may include a reference clock generating unit 10, image processing unit 20, output clock generating unit 30, output image synchronization signal generating unit 40, and image storage unit 50.

The reference clock generating unit 10 may generate a reference clock required for various image processing operations such as memory read/write operation. The input video clock may have a wide frequency range. Therefore, in order to process the input video clock having a wide frequency range in a consistent manner, a predetermined reference clock is needed.

The image processing unit 20 performs a series of image processing operations to process an input image with resolution higher than that allowed within the display device. The image processing unit 20 may divide input image data with first resolution transmitted at an input video clock into image blocks with an acceptable size and generate processed image data with second resolution lower than the first resolution. Since the reference clock is synchronized with the processed image data with second resolution, the reference clock is slower than the input video clock synchronized with the input image data with first resolution. If image processing is performed under the setting as described above, data loss is unavoidable. Instead of increasing the reference clock and memory capacity in an attempt to avoid data loss during image processing, the image processing unit 20 lowers the input video clock down below the reference clock through data partitioning and parallel processing while maintaining the reference clock and memory capacity.

More specifically, the image processing unit 20 divides input image data with first resolution into a plurality of blocks and parallel-processes the image data partitioned to a plurality of blocks through a predetermined reference clock and storage space to support second resolution, thereby generating processed image data with second resolution.

The image processing unit 20, to generate processed image data with second resolution, may reduce not only each horizontal line of image data divided into a plurality of blocks by half through a horizontal digital filter but also each vertical line of image data divided into a plurality of blocks by half through a vertical digital filter. A horizontal digital filter and a vertical digital filter may be implemented by pixel data selected to compensate for image quality degraded due to image data removed during filtering and a finite impulse response digital filter referencing finite pixel data in the vicinity of the pixel data.

The image processing unit 20 may reduce an abrupt change in an image due to vertical/horizontal filtering by making filter coefficients of the horizontal/vertical digital filter support low pass filtering and thereby implementing an equalization process.

When a horizontal digital filter is applied, the image processing unit 20 may further reference part of image data of neighbor blocks and arbitrary first dummy data to calculate equalization coefficients. To this end, the image processing unit 20 may store image data belonging to each block and part of image data of neighbor blocks into a line memory. And the image processing unit 20 may duplicate first and last pixel data of image data divided into a plurality of blocks to generate the arbitrary first dummy data.

Also, the image processing unit 20 may further reference arbitrary second dummy data to calculate equalization coefficients when a vertical digital filter is applied. The image processing unit 20 may duplicate first and last line data of image data divided into a plurality of blocks to generate the arbitrary second dummy data.

The output clock generating unit 30 generates an output clock determined according to screen resolution of the display unit. By default, the output clock may be lower than the reference clock.

The output image synchronization signal generating unit 40 may generate an output vertical synchronization signal and an output horizontal synchronization signal according to screen resolution by referencing an output clock.

The image storage unit 50 resizes processed image data of second resolution so that output image data is fitted to the screen. The image storage unit 50 receives processed image data of second resolution from the image processing unit 20 and receives an output vertical synchronization signal and an output horizontal synchronization signal from the output image synchronization signal generating unit 40. The image storage unit 50 references the output vertical synchronization signal and the output horizontal synchronization signal and stores an image area corresponding to the horizontal active area (HAA) and the vertical active area (VAA) out of the processed image data with second resolution. In other words, the image storage device 50 resizes the processed image data of second resolution into output image data suitable for the screen resolution and transmits the output image data to the display unit.

The display unit displays output image data on the screen.

The display unit receives output image data from the image processing device 100 and displays the corresponding image on the screen. The display unit includes a display panel and a display panel driving unit.

The screen of a display panel includes a pixel array displaying an output image. A pixel array includes a plurality of data lines, a plurality of gate lines (or scan lines) crossing the data lines, and pixels disposed in a matrix form. Individual pixels may be divided into red sub-pixels, green sub-pixels, and blue sub-pixels to implement colors. Each pixel may further include a white sub-pixel.

Touch sensors may be disposed on the display panel. A touch input may be sensed by using touch sensors or through pixels. Touch sensors may be disposed on the screen of the display panel in the form of on-cell type or add-on type sensors or implemented in the form of in-cell type touch sensors embedded in a pixel array.

The display panel driving unit writes output image data into the pixels of the display panel to display an output image on the screen of the display panel. The display panel driving unit includes a data driving unit, a gate driving unit (or scan driving unit), and a timing controller (TCON). The display panel driving unit may further include a touch sensor driving unit for driving touch sensors. For mobile devices, the timing controller, data driving unit, and power supply circuit may be integrated into one driving IC chip.

The data driving unit converts output image data received from the timing controller for each frame into analog gamma-compensated voltages to output data voltages by using a digital-to-analog converter (in what follows, it is called a DAC). By using a shift register, the gate driving unit may provide gate signals (or scan signals) synchronized to data voltages to gate lines sequentially under the control of the timing controller.

The timing controller receives output image data received from the image processing device 100 and an output vertical synchronization signal and horizontal synchronization signal synchronized to the output image data. The timing controller transmits output image data to the data driving unit and controls operation timing of the data driving unit and the gate driving unit.

Figure 3:
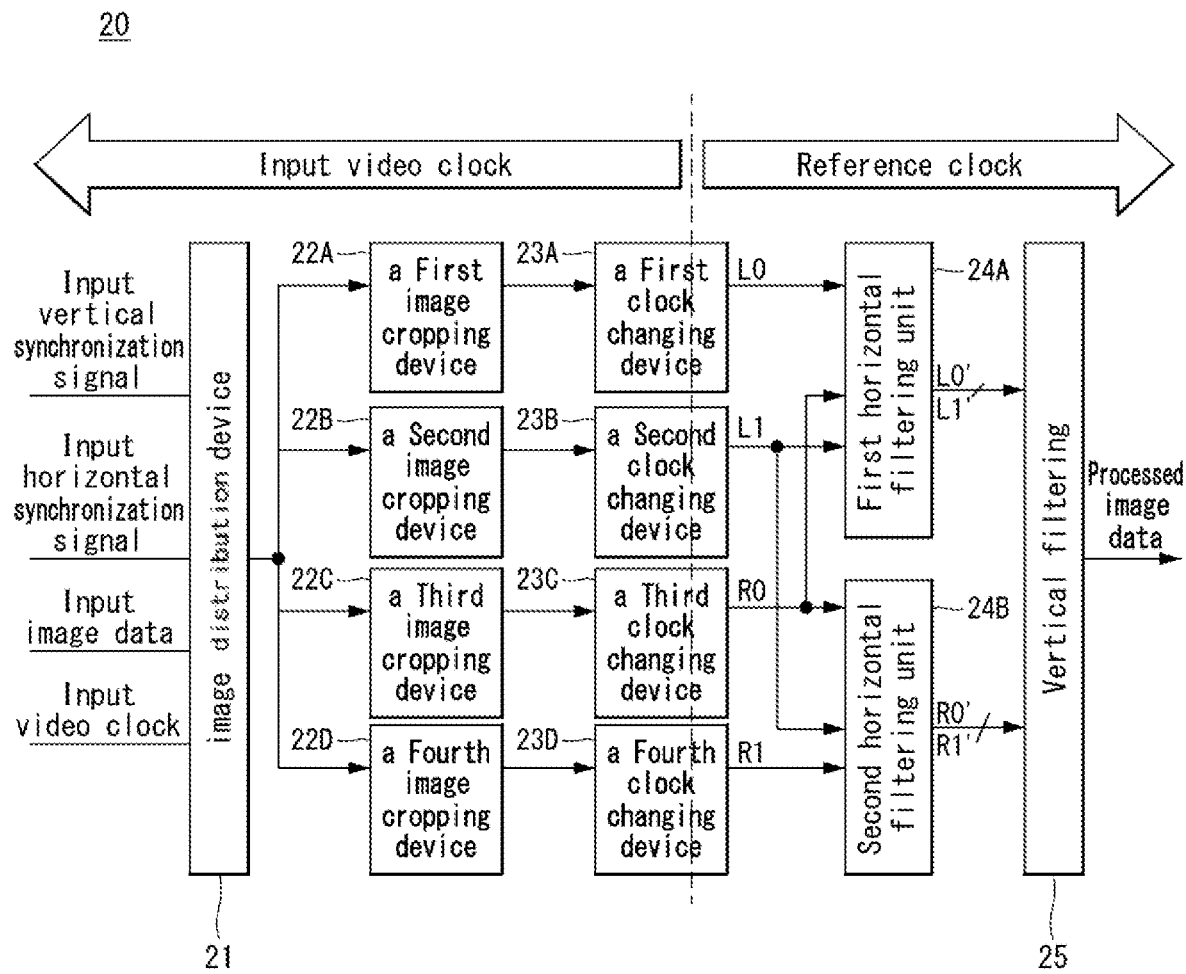
FIG. 3 illustrates a structure of the image processing unit of FIG. 2.
Figure 4:
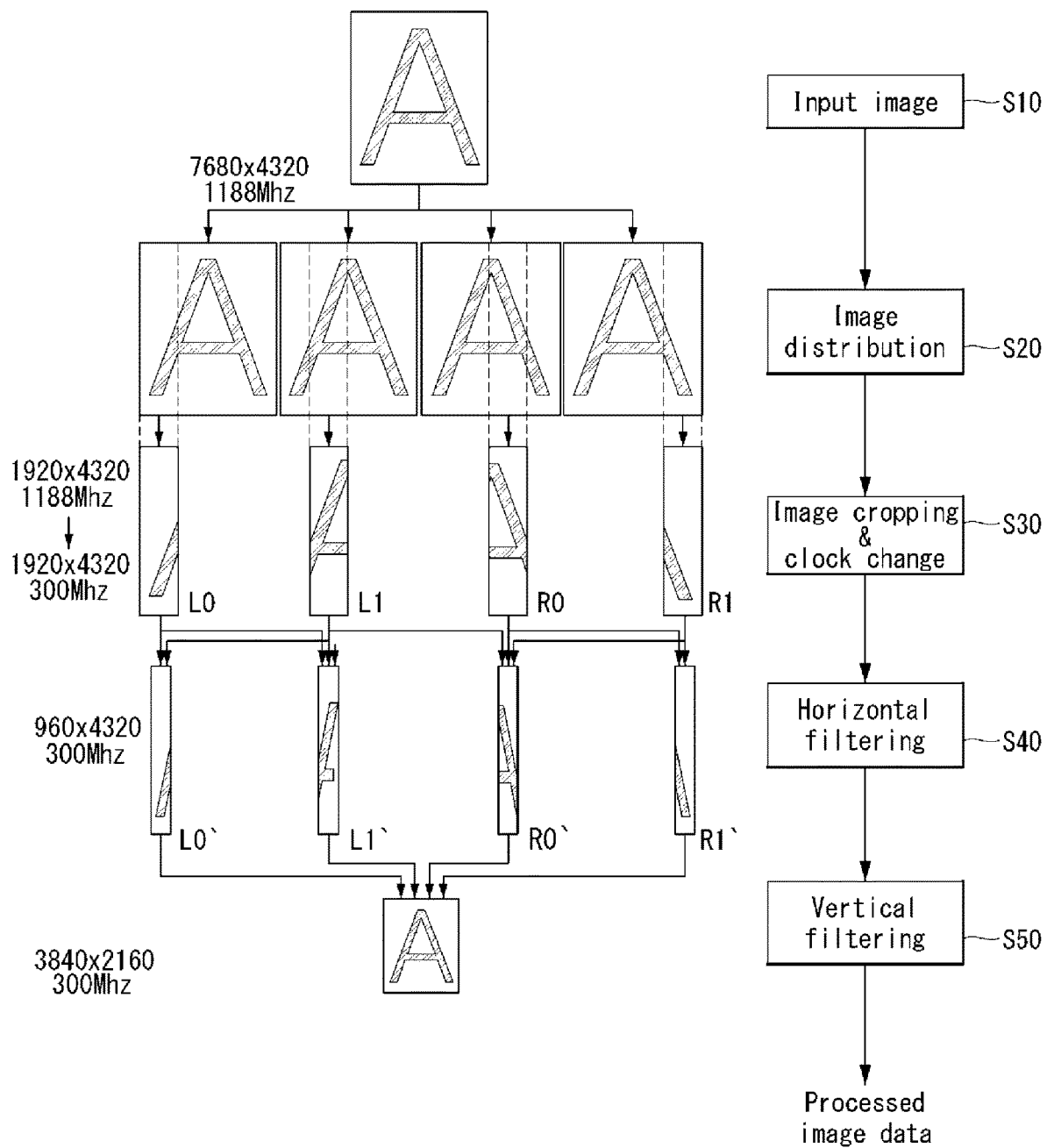
FIG. 4 illustrates an image processing method of the image processing unit of FIG. 2.
Figure 5:
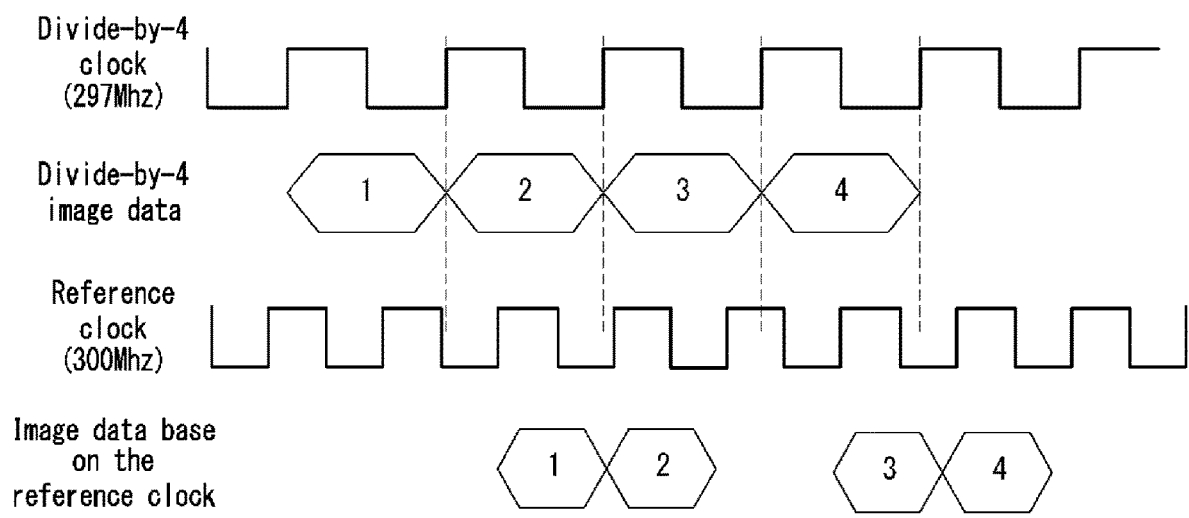
FIG. 5 illustrates reading out image data in accordance with a reference clock in a first to a fourth clock changing unit of FIG. 3.
Figure 6:
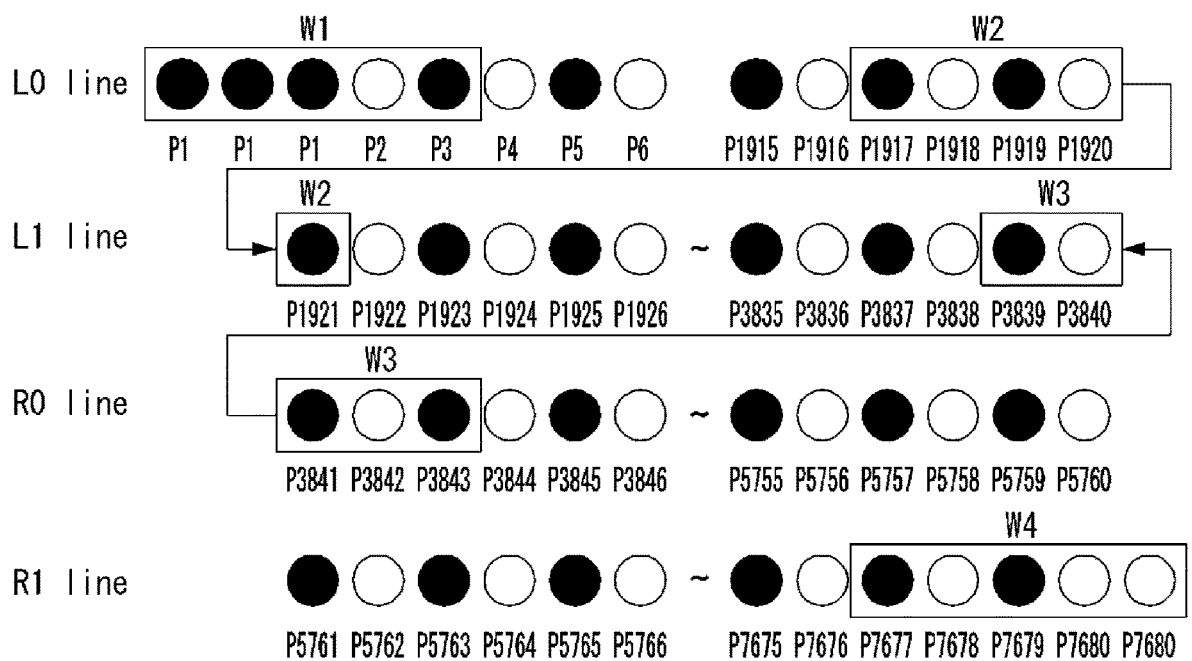
FIG. 6 illustrates an equalization process and a boundary area processing process in a first and a second horizontal filter unit of FIG. 3.
Figure 7:
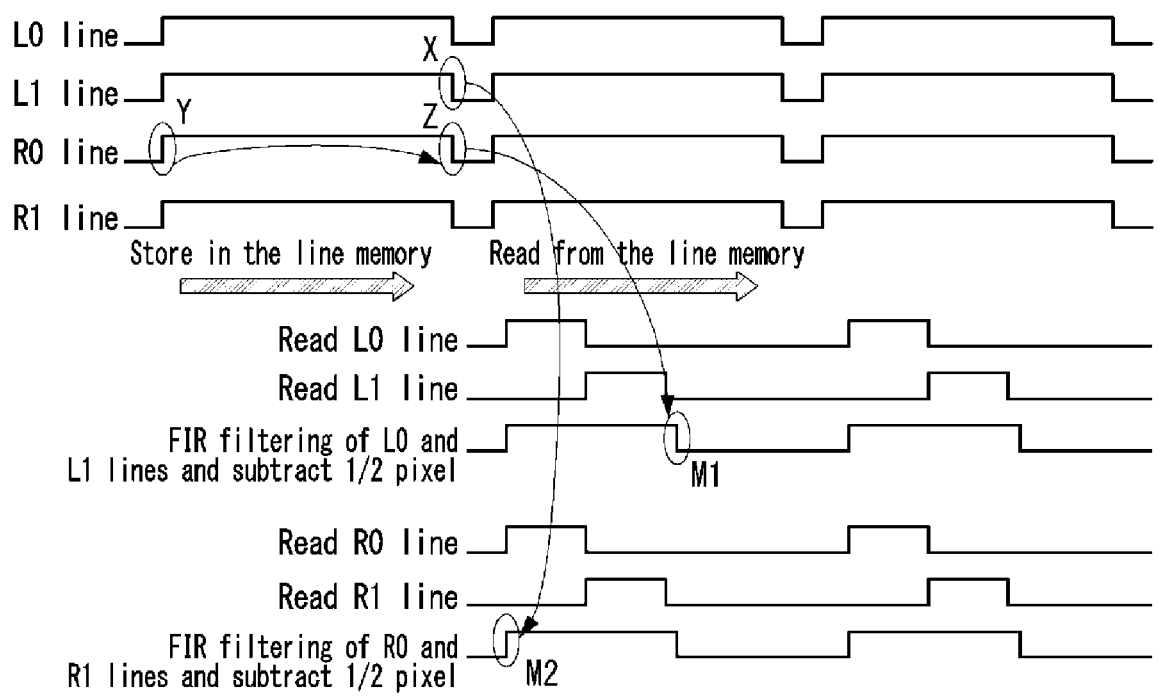
FIG. 7 illustrates a line memory storing and reading operations in the first and the second horizontal filter unit of FIG. 3.
Figure 8:
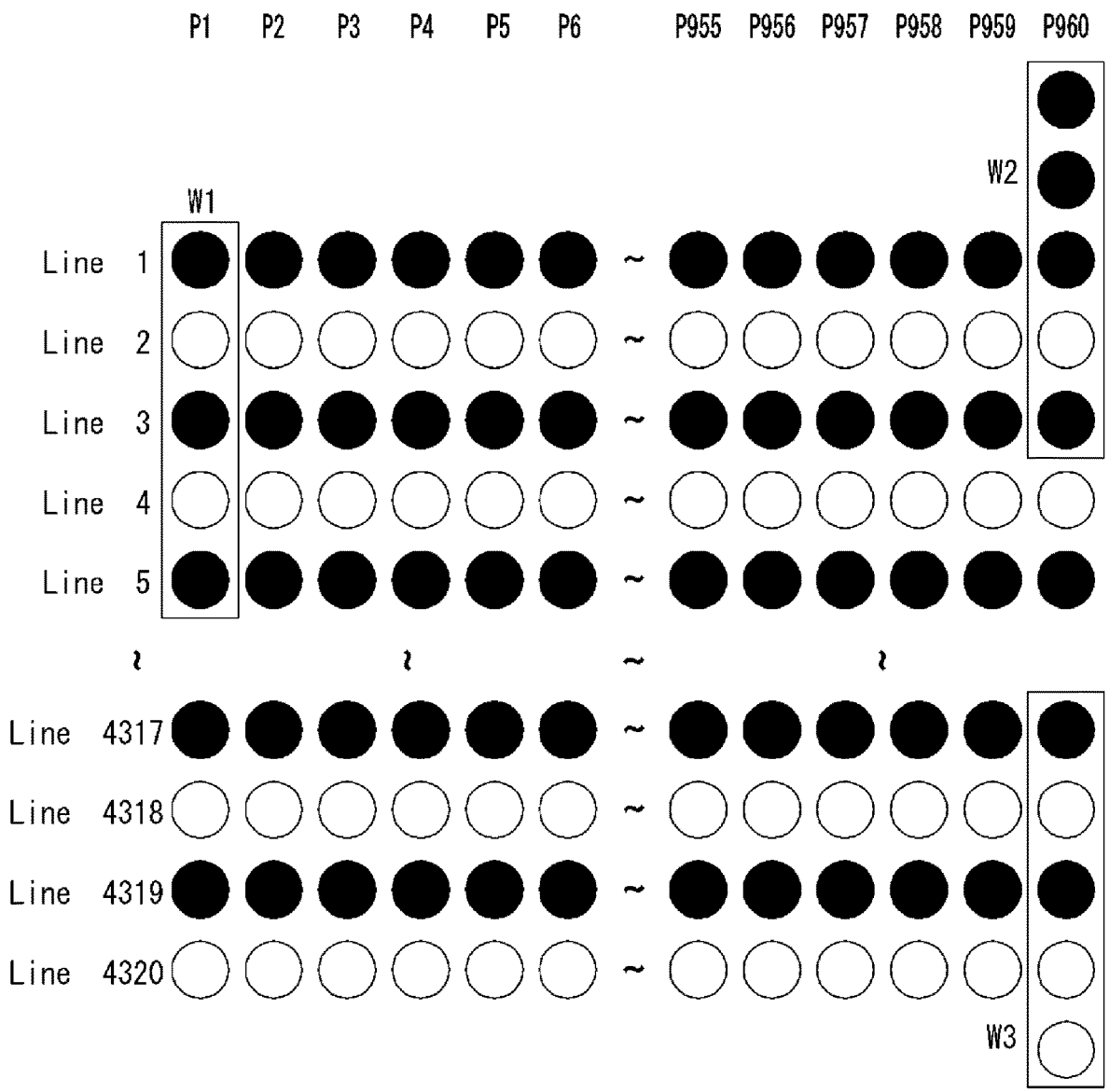
FIGS. 8 and 9 illustrate an equalization process in the vertical filter unit of FIG. 3.
Figure 9:
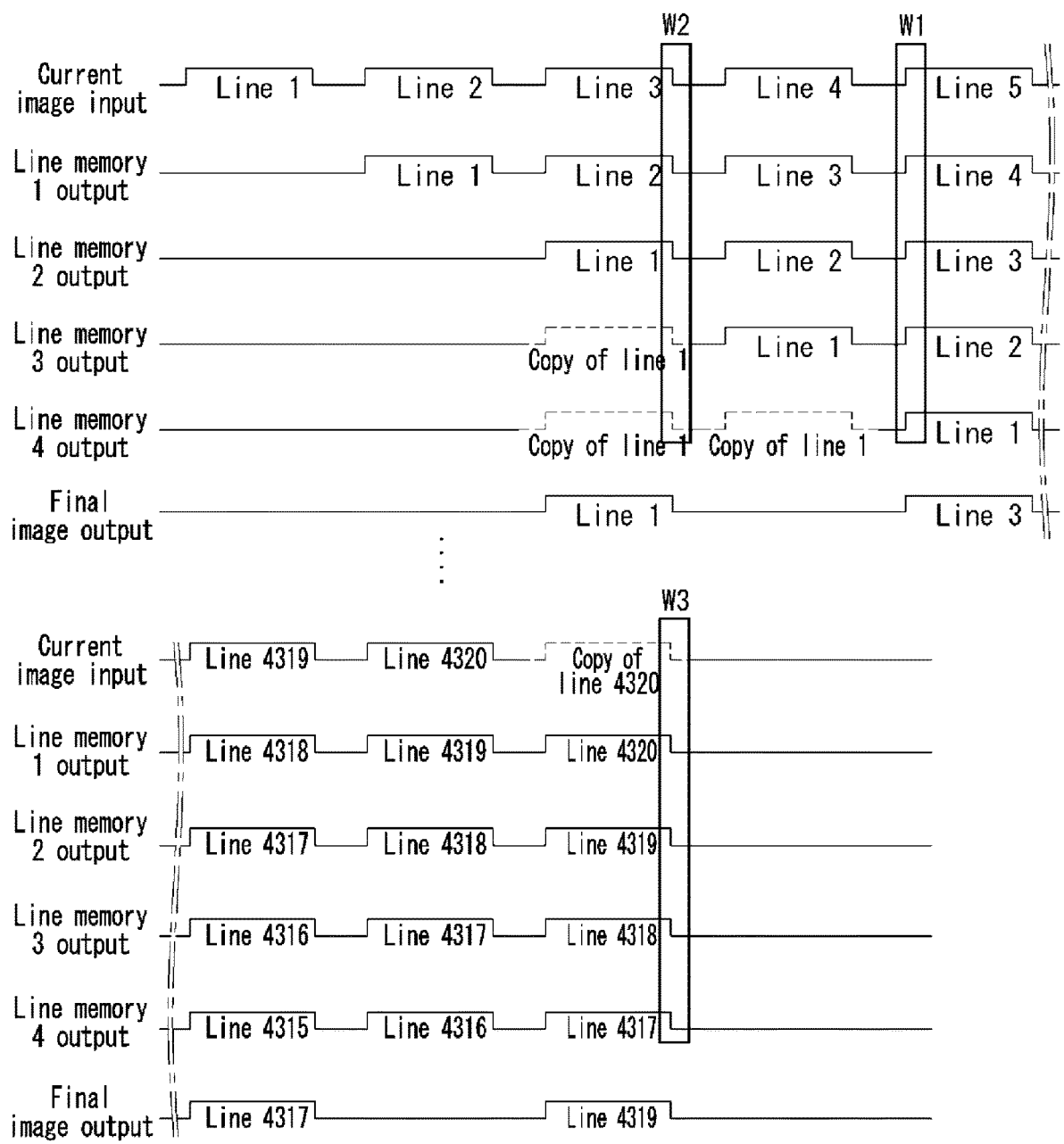

FIG. 3 illustrates a structure of the image processing unit 20 of FIG. 2. FIG. 4 illustrates an image processing method of the image processing unit of FIG. 2. FIG. 5 illustrates reading out image data in accordance with a reference clock in a first to a fourth clock changing unit of FIG. 3. FIG. 6 illustrates an equalization process and a boundary area processing process in a first and a second horizontal filter unit of FIG. 3. FIG. 7 illustrates a line memory storing and reading operations in the first and the second horizontal filter unit of FIG. 3. FIGS. 8 and 9 illustrate an equalization process in the vertical filter unit of FIG. 3.

In the embodiments of FIGS. 3 to 9, the image processing unit 20 divides input image data of first resolution into image blocks of an acceptable size to generate processed image data of second resolution, where the first resolution may be M×N (where M and N are natural numbers), and the second resolution may be (M/2)×(N/2). Here, M represents the number of unit pixels arranged one after another in the horizontal direction on the screen, and N represents the number of pixel lines arranged one after another in the vertical direction on the screen.

In the description of embodiments below, the first resolution is denoted as 7680×4320 which is 8K resolution, and the second resolution is denoted as 3840×2160 which is Ultra High Definition (UHD) resolution. In this case, an input video clock may be 1188 MHz, a reference clock 300 MHz, and an output clock 297 MHz. One-pixel line of an 8K resolution screen consists of 7680 unit pixels, and 1120 dummy pixels may be disposed between pixel lines. And the 8K resolution screen consists of 4320 pixel lines, including 180 dummy lines. In this case, if 30 frames are displayed per second, a clock of 1188 MHz is needed since (7680+112)× (4320+180)×30=1,188,000,000.

However, since the first and the second resolution and clock frequency due to the first and the second resolution may be modified in various ways, the technical principles of the present invention are not limited to a specific embodiment described below.

Referring to FIGS. 3 and 4, the image processing unit 20 may lower the input video clock down below a reference clock by processing input image data in parallel. To this end, the image processing unit 20 may include an image distributing device 21, first to fourth image cropping devices 22A, 22B, 22C, 22D, first to fourth clock changing units 23A, 23B, 23C, 23D, first and second horizontal filtering units 24A, 24B, and vertical filtering unit 25.

The image distributing device 21 receives an input vertical synchronization signal, input horizontal synchronization signal, input video clock, and input image data from an external image source S10. The image distributing device 21 duplicates input image data to generate four distributed image data with M ×N resolution (namely 7680 ×4320) S20. Each of the four distributed image data may be synchronized with the input video clock of 1188 MHz.

Meanwhile, TVs are usually designed to receive up to four different image sources. Therefore, if the number of distributed image data is set to four, a structural change of currently employed System on Chips (SoCs) may be kept to a minimum. Also, if the number of distributed image data is set to 4, it becomes easier to reduce a divide-by-4 clock (1188 MHz/4=297 MHz) than to reduce the reference clock (300 MHz). Meanwhile, if the number of distributed image data is set to 2, since the divide-by-2 clock (594 MHz) is larger than the reference clock (300 MHz), it is impossible to read out data while, if the number of distributed image data is set to 8, the divide-by-8 clock (148.5 MHz) becomes too small compared with the reference clock (300 MHz), and the number of wasted clock intervals is increased. Also, since the number of image inputs is an even number, it is not preferable to divide the image input by odd number of times. In this manner, the number of distributed image data may be determined appropriately according to the resolution of an input image, frequency of an input video clock, SoC structure, and frequency of a reference clock.

The first to fourth image cropping unit 22A, 22B, 22C, 22D crop a predetermined amount of data from each of the four distributed image data, which provides an image of M/4×4 resolution (namely 1920×4320), and generate four image data synchronized to the input video clock of 1188 MHz S30. In other words, the first to fourth image cropping unit 22A, 22B, 22C, 22D performs the function of cropping image data amounting to 2K resolution from the distributed image data of 8K resolution.

To implement a hardware system easily and reduce the cost, it is preferable to lower the reference clock and parallel-process the image data. The first image cropping unit 22A may crop pixel data ranging from the 1st to the 1920-th pixel out of each 4320 pixel line, the second image cropping unit 22B may crop pixel data ranging from the 1921-th to the 3840-th pixel, the third image cropping unit 22C from the 3841-th to the 5760-th pixel, and the fourth image cropping unit 22D from the 5761-th to the 7680-th data.

The first to the fourth image cropping unit 22A, 22B, 22C, 22D transmit the four cropped image data to the first to the fourth clock changing unit 23A, 23B, 23C, 23D, respectively at the same timing.

The first to the fourth clock changing unit 23A, 23B, 23C, 23D may generate first to fourth block image data L0, L1, R0, R1, each of which having M/4×N resolution (namely 1920×4320), by parallel-processing the image data received simultaneously from the first to the fourth image cropping unit 22A, 22B, 22C, 22D according to a predetermined reference clock S30. The first to the fourth clock changing unit 23A, 23B, 23C, 23D store the first to the fourth block image data L0, L1, R0, R1 to four line memories prepared in the first and the second horizontal filtering unit 24A, 24B. The first to the fourth block image data L0, L1, R0, R1 are synchronized to the reference clock of 300 MHz.

The first to the fourth clock changing unit 23A, 23B, 23C, 23D may read out the divide-by-4 image data received from the first to the fourth image cropping unit 22A, 22B, 22C, 22D according to the reference clock (300 MHz) which is always faster than the divide-by-4 clock (297 MHz) by using a First-In First-Out (FIFO) data processor. By doing so, the first to the fourth clock changing unit 23A, 23B, 23C, 23D may change a clock area to a reference clock area and process image data according to the reference clock, thereby maintaining unity and consistency.

The first to the second horizontal filtering unit 24A, 24B reduce the horizontal resolution of the first to the fourth block image data L0, L1, R0, R1 stored in the four line memories by half through the horizontal digital filter. The first to the fourth block image data whose horizontal resolution has been reduced by half are synchronized to the reference clock of 300 MHz and the fifth to the eighth block image data (L0', L1, R0', R1'), each of which having M/8×N resolution (namely 960×4320), may be generated S40. The first and the second horizontal filtering unit 24A, 24B may be implemented by pixel data selected to compensate for image quality degraded due to image data removed during filtering and a finite impulse response (FIR) digital filter referencing finite pixel data in the vicinity of the pixel data.

An FIR filter utilizes correlation with neighboring pixel data. The first and the second filtering unit 24A, 24B may reduce an abrupt change in an image due to horizontal filtering by applying an equalization process based on low pass filtering. To calculate equalization coefficients, as shown in FIG. 6, the first and the second horizontal filtering unit 24A, 24B may set the filter mask size (namely the number of filter taps) to K pixels (where K is a natural number), for example, 5 pixels. In this case, the first and the second horizontal filtering unit 24A, 24B read out one desired pixel and four pixels adjacent to the desired pixel and calculates the equalization coefficient by using the five pixels. For example, when a desired pixel is P3, its neighboring pixels become P1, P2, P4, and P5, and the equalization coefficient applied to the P3 becomes (P1×1 +P2×2+ P3×3+P4×2+P5×1)/9. As the equalization coefficient is multiplied to the corresponding pixel P3, a sharp change in the image due to horizontal filtering may be reduced. In this manner, the first and the second horizontal filtering unit 24A, 24B may sample pixel data such as P1, P3, P5, . . . , P7677, P7679 and generate fifth to eighth block image data L0', L1, R0', R1'. The weights W1, W2, W3 multiplied to the pixel data within the filter mask may have various values according to the type and properties of an input image.

The first horizontal filtering unit 24A is connected to the outputs of the first and the second clock changing unit 23A, 23B for processing the boundary area among the first to the third block image data L0, L1, R0, stores the first and the second block image data L0, L1 into the first and the second line memory. Furthermore, the first horizontal filtering unit 24A may be connected to the output of the third clock changing unit 23C and store part of the third block image data R0 additionally into the first and the second line memory.

In the example of the filter mask W2 of FIG. 6, when the equalization coefficient of P1919 pixel of the first block image data L0 is calculated, the first horizontal filtering unit 24A may further reference the pixel data P1921 in the second block image data L1. In the same manner, when the equalization coefficient of P3839 pixel of the second block image data L1 is calculated, the first horizontal filtering unit 24A may further reference the pixel data P3841 of the third block image data R0. To this end, as shown in FIG. 7, the first horizontal filtering unit 24A may further store the pixel data P3841 of the third block image data R0 into the first and the second line memory at Y and Z timing; when the equalization coefficient of P3839 pixel data of the second block image data L1 is calculated at M1 timing, the first horizontal filtering unit 24A may further reference P3841 pixel data of the third block image data R0.

Also, in the example of the filter mask W1, when the equalization coefficient of P1 pixel of the first block image data L0 is calculated, the first horizontal filtering unit 24A may further reference arbitrary first dummy data P1. At this time, the first horizontal filtering unit 24A may generate the first dummy data P1 by duplicating the pixel data P1 of the first block image data L0.

The second horizontal filtering unit 24B is connected to the outputs of the third and the fourth clock changing unit 23C, 23D for processing the boundary area among the second to the fourth block image data L1, R0, R1 and may store the third and the fourth block image data R0, R1 into the third and the fourth line memory. Furthermore, the second horizontal filtering unit 24B is connected to the output of the second clock changing unit 23B and may store part of the second block image data L1 additionally into the third and the fourth line memory.

In the example of the filter mask W3 of FIG. 6, when the equalization coefficient of P3841 pixel of the third block image data R0 is calculated, the second horizontal filtering unit 24B may further reference P3839 and P3840 pixel of the second block image data L1. In the same way, when the equalization coefficient of P5761 pixel of the fourth block image data R1 is calculated, the second horizontal filtering unit 24B may further reference P5759 and P5760 pixels of the third block image data R0. To this end, as shown in FIG. 7, the second horizontal filtering unit 24B may further store the P3839 and P3840 pixel of the second block image data L1 into the third and the fourth line memory at the X timing. And when the equalization coefficient of P3841 pixel of the third block image data R0 is calculated at the M2 timing, the second horizontal filtering unit 24B may further reference P3839 and P3840 pixel of the second block image data L1.

Also, in the example of the filter mask W4, when the equalization coefficient of P7679 of the fourth block image data R1 is calculated, the second horizontal filtering unit 24B may further reference arbitrary second dummy data P7680. At this time, the second horizontal filtering unit 24B may generate the second dummy data P7680 by duplicating the P7680 pixel of the fourth block image data R1.

The vertical filtering unit 25 may reduce the vertical resolution of the fifth to the eighth block image data L0', L1, R0', R1' by half through the vertical digital filter to generate processed image data with (M/2)×(N/2) resolution (namely 3840×2160). The processed image data is synchronized to the reference clock of 300 MHz.

The vertical filtering unit 25 may be implemented by pixel data selected to compensate for image quality degraded due to image data removed during filtering and an FIR filter referencing finite pixel data in the vicinity of the pixel data.

To calculate equalization coefficients, as shown in FIG. 8, the vertical filtering unit 25 may set the filter mask size (namely the number of filter taps) to K pixels (where K is a natural number), for example, 5 pixels. In this case, the vertical filtering unit 25 reads out one desired pixel and four pixels adjacent to the desired pixel and calculates the equalization coefficient by using the five pixels. As the equalization coefficient is multiplied to the corresponding pixel data, a sharp change in the image due to vertical filtering may be reduced. In this manner, the vertical filtering unit 25 may sample desired pixel data from the fifth to the eighth block image data L0', L1, R0', R1' and reduce the number of pixel lines by half, thereby generating processed image data of 3840×2160 resolution.

To calculate the equalization coefficient at the time of vertical filtering, the vertical filtering unit 25 may further reference arbitrary line dummy data.

For example, in the example of the filter mask W2 of FIG. 8, when the equalization coefficient for the first line data of the processed image data is calculated, the first line dummy data may be further referenced. To this end, as shown in FIG. 9, the vertical filtering unit 25 may generate the first line dummy data by duplicating the first line data.

Also, in the example of the filter mask W3 of FIG. 8, when the equalization coefficient for the 4320-th line data of the processed image data is calculated, the second line dummy data may be further referenced. To this end, as shown in FIG. 9, the vertical filtering unit 25 may generate the second line dummy data by duplicating the 4320-th line data.

Figure 10:
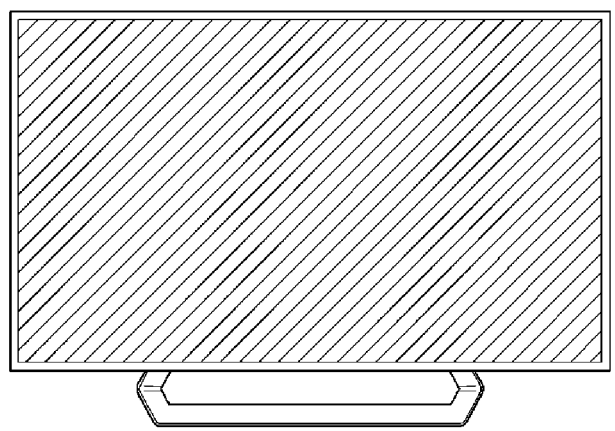
FIG. 10 illustrates various examples of a display device.
Figure 10:
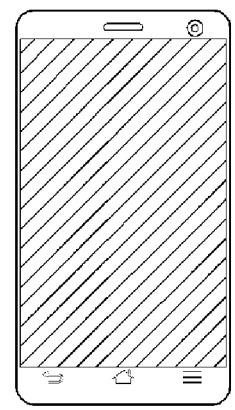

FIG. 10 illustrates various examples of a display device.

As shown in FIG. 10, the display device of the present invention may be applied to various types of display devices such as a stationary display device A and a display device B of a mobile terminal. A typical example of the stationary display device A includes a TV and a computer monitor. A mobile terminal may include a mobile phone, smart phone, and wearable device. The display device of the present invention may include the image processing device 100 and the display device described above. The image processing device 100 may be disposed in the controller shown in FIGS. 11 to 13.

Figure 11:
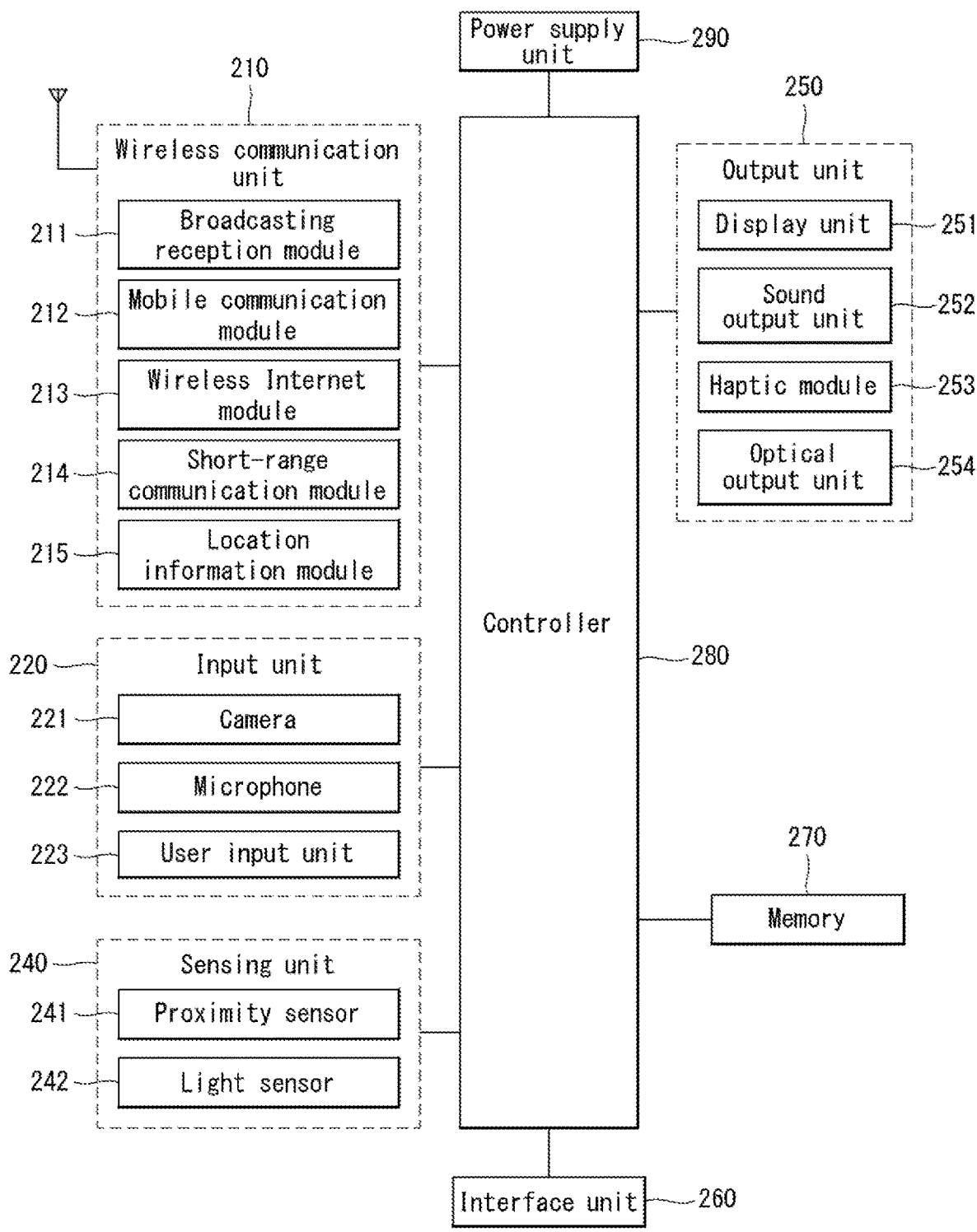
FIG. 11 is a block diagram illustrating one example of a mobile terminal.

Reference is now made to FIG. 11, where FIG. 11 is a block diagram of a mobile terminal in accordance with the present disclosure.

The mobile terminal 200 is shown having components such as a wireless communication unit 210, an input unit 220, a sensing unit 240, an output unit 250, an interface unit 260, a memory 270, a controller 280, and a power supply unit 290. It is understood that implementing all of the illustrated components is not a requirement, and that greater or fewer components may alternatively be implemented.

Referring now to FIG. 11, the mobile terminal 200 is shown having wireless communication unit 210 configured with several commonly implemented components. For instance, the wireless communication unit 210 typically includes one or more components which permit wireless communication between the mobile terminal 200 and a wireless communication system or network within which the mobile terminal is located.

The wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks. To facilitate such communications, the wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, audio, video, image, and the like) is obtained by the input unit 220 and may be analyzed and processed by controller 280 according to device parameters, user commands, and combinations thereof.

The sensing unit 240 is typically implemented using one or more sensors configured to sense internal information of the mobile terminal, the surrounding environment of the mobile terminal, user information, and the like. For example, in FIG. 1A, the sensing unit 240 is shown having a proximity sensor 241 and an illumination sensor 242.

If desired, the sensing unit 240 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and combinations thereof.

The output unit 250 is typically configured to output various types of information, such as audio, video, tactile output, and the like. The output unit 250 is shown having a display unit 251, an audio output module 252, a haptic module 253, and an optical output module 254.

The display unit 251 may have an inter-layered structure or an integrated structure with a touch sensor in order to facilitate a touch screen. The touch screen may provide an output interface between the mobile terminal 200 and a user, as well as function as the user input unit 223 which provides an input interface between the mobile terminal 200 and the user.

The interface unit 260 serves as an interface with various types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 may provide or process information or functions appropriate for a user by processing signals, data, information and the like, which are input or output by the various components depicted in FIG. 1A, or activating application programs stored in the memory 270. As one example, the controller 280 controls some or all of the components illustrated in FIGS. 11 according to the execution of an application program that have been stored in the memory 270.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body.

Referring still to FIG. 11, various components depicted in this figure will now be described in more detail. Regarding the wireless communication unit 210, the broadcast receiving module 211 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 211 may be utilized to facilitate simultaneously receiving of two or more broadcast channels, or to support switching among broadcast channels.

The mobile communication module 212 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 212 include audio call signals, video (telephony) call signals, or various formats of data to support communication of text and multimedia messages.

The wireless Internet module 213 is configured to facilitate wireless Internet access. This module may be internally or externally coupled to the mobile terminal 200. The wireless Internet module 213 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX, High Speed Downlink Packet Access (HSDPA), HSUPA(High Speed Uplink Packet Access), Long Term Evolution (LTE), LTE-A(Long Term Evolution-Advanced), and the like. The wireless Internet module 213 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 213 performs such wireless Internet access. As such, the Internet module 213 may cooperate with, or function as, the mobile communication module 212.

The short-range communication module 214 is configured to facilitate short-range communications. Suitable technologies for implementing such short-range communications include BLUETOOTHTM, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 214 in general supports wireless communications between the mobile terminal 200 and a wireless communication system, communications between the mobile terminal 200 and another mobile terminal 200, or communications between the mobile terminal and a network where another mobile terminal 200 (or an external server) is located, via wireless area networks. One example of the wireless area networks is a wireless personal area networks.

In some embodiments, another mobile terminal (which may be configured similarly to mobile terminal 200) may be a wearable device, for example, a smart watch, a smart glass or a head mounted display (HMD), which is able to exchange data with the mobile terminal 200 (or otherwise cooperate with the mobile terminal 200). The short-range communication module 214 may sense or recognize the wearable device, and permit communication between the wearable device and the mobile terminal 200. In addition, when the sensed wearable device is a device which is authenticated to communicate with the mobile terminal 200, the controller 280, for example, may cause transmission of data processed in the mobile terminal 200 to the wearable device via the short-range communication module 214. Hence, a user of the wearable device may use the data processed in the mobile terminal 200 on the wearable device. For example, when a call is received in the mobile terminal 200, the user may answer the call using the wearable device. Also, when a message is received in the mobile terminal 200, the user can check the received message using the wearable device.

The location information module 215 is generally configured to detect, calculate, derive or otherwise identify a position of the mobile terminal. As an example, the location information module 215 includes a Global Position System (GPS) module, a Wi-Fi module, or both. If desired, the location information module 215 may alternatively or additionally function with any of the other modules of the wireless communication unit 210 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 220 may be configured to permit various types of input to the mobile terminal 220. Examples of such input include audio, image, video, data, and user input. Image and video input is often obtained using one or more cameras 221. Such cameras 221 may process image frames of still pictures or video obtained by image sensors in a video or image capture mode. The processed image frames can be displayed on the display unit 251 or stored in memory 270. In some cases, the cameras 221 may be arranged in a matrix configuration to permit a plurality of images having various angles or focal points to be input to the mobile terminal 200. As another example, the cameras 221 may be located in a stereoscopic arrangement to acquire left and right images for implementing a stereoscopic image.

The microphone 222 is generally implemented to permit audio input to the mobile terminal 200. The audio input can be processed in various manners according to a function being executed in the mobile terminal 200. If desired, the microphone 222 may include assorted noise removing algorithms to remove unwanted noise generated in the course of receiving the external audio.

The user input unit 223 is a component that permits input by a user. Such user input may enable the controller 180 to control operation of the mobile terminal 200. The user input unit 223 may include one or more of a mechanical input element (for example, a key, a button located on a front and/or rear surface or a side surface of the mobile terminal 200, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 240 is generally configured to sense one or more of internal information of the mobile terminal, surrounding environment information of the mobile terminal, user information, or the like. The controller 280 generally cooperates with the sending unit 240 to control operation of the mobile terminal 200 or execute data processing, a function or an operation associated with an application program installed in the mobile terminal based on the sensing provided by the sensing unit 240. The sensing unit 240 may be implemented using any of a variety of sensors, some of which will now be described in more detail.

The proximity sensor 241 may include a sensor to sense presence or absence of an object approaching a surface, or an object located near a surface, by using an electromagnetic field, infrared rays, or the like without a mechanical contact. The proximity sensor 241 may be arranged at an inner region of the mobile terminal covered by the touch screen, or near the touch screen.

The proximity sensor 241, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 241 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 241 may sense proximity touch, and proximity touch patterns (for example, distance, direction, speed, time, position, moving status, and the like).

In general, controller 280 processes data corresponding to proximity touches and proximity touch patterns sensed by the proximity sensor 241, and cause output of visual information on the touch screen. In addition, the controller 280 can control the mobile terminal 200 to execute different operations or process different data according to whether a touch with respect to a point on the touch screen is either a proximity touch or a contact touch.

A touch sensor can sense a touch applied to the touch screen, such as display unit 251, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 251, or convert capacitance occurring at a specific part of the display unit 251, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 280. Accordingly, the controller 280 may sense which region of the display unit 251 has been touched. Here, the touch controller may be a component separate from the controller 280, the controller 280, and combinations thereof.

In some embodiments, the controller 280 may execute the same or different controls according to a type of touch object that touches the touch screen or a touch key provided in addition to the touch screen. Whether to execute the same or different control according to the object which provides a touch input may be decided based on a current operating state of the mobile terminal 200 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 280, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 221 typically includes at least one a camera sensor (CCD, CMOS etc.), a photo sensor (or image sensors), and a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 251 is generally configured to output information processed in the mobile terminal 200. For example, the display unit 251 may display execution screen information of an application program executing at the mobile terminal 200 or user interface (UI) and graphic user interface (GUI) information in response to the execution screen information.

In some embodiments, the display unit 251 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 252 is generally configured to output audio data. Such audio data may be obtained from any of a number of different sources, such that the audio data may be received from the wireless communication unit 210 or may have been stored in the memory 270. The audio data may be output during modes such as a signal reception mode, a call mode, a record mode, a voice recognition mode, a broadcast reception mode, and the like. The audio output module 252 can provide audible output related to a particular function (e.g., a call signal reception sound, a message reception sound etc.) performed by the mobile terminal 200. The audio output module 252 may also be implemented as a receiver, a speaker, a buzzer, or the like.

A haptic module 253 can be configured to generate various tactile effects that a user feels, perceive, or otherwise experience. A typical example of a tactile effect generated by the haptic module 253 is vibration. The strength, pattern and the like of the vibration generated by the haptic module 253 can be controlled by user selection or setting by the controller. For example, the haptic module 253 may output different vibrations in a combining manner or a sequential manner Besides vibration, the haptic module 253 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 253 can also be implemented to allow the user to feel a tactile effect through a muscle sensation such as the user's fingers or arm, as well as transferring the tactile effect through direct contact. Two or more haptic modules 253 may be provided according to the particular configuration of the mobile terminal 200.

An optical output module 254 can output a signal for indicating an event generation using light of a light source. Examples of events generated in the mobile terminal 200 may include message reception, call signal reception, a missed call, an alarm, a schedule notice, an email reception, information reception through an application, and the like.

A signal output by the optical output module 254 may be implemented in such a manner that the mobile terminal emits monochromatic light or light with a plurality of colors. The signal output may be terminated as the mobile terminal senses that a user has checked the generated event, for example.

The interface unit 260 serves as an interface for external devices to be connected with the mobile terminal 200. For example, the interface unit 260 can receive data transmitted from an external device, receive power to transfer to elements and components within the mobile terminal 200, or transmit internal data of the mobile terminal 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 200 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 200 via the interface unit 260.

When the mobile terminal 200 is connected with an external cradle, the interface unit 260 can serve as a passage to allow power from the cradle to be supplied to the mobile terminal 200 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 270 can store programs to support operations of the controller 280 and store input/output data (for example, phonebook, messages, still images, videos, etc.). The memory 270 may store data related to various patterns of vibrations and audio which are output in response to touch inputs on the touch screen.

The memory 270 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 200 may also be operated in relation to a network storage device that performs the storage function of the memory 170 over a network, such as the Internet.

The controller 280 may typically control the general operations of the mobile terminal 200. For example, the controller 280 may set or release a lock state for restricting a user from inputting a control command with respect to applications when a status of the mobile terminal meets a preset condition.

The controller 280 can also perform the controlling and processing associated with voice calls, data communications, video calls, and the like, or perform pattern recognition processing to recognize a handwriting input or a picture drawing input performed on the touch screen as characters or images, respectively. In addition, the controller 280 can control one or a combination of those components in order to implement various exemplary embodiments disclosed herein.

The power supply unit 290 receives external power or provide internal power and supply the appropriate power required for operating respective elements and components included in the mobile terminal 200. The power supply unit 290 may include a battery, which is typically rechargeable or be detachably coupled to the terminal body for charging.

The power supply unit 290 may include a connection port. The connection port may be configured as one example of the interface unit 260 to which an external charger for supplying power to recharge the battery is electrically connected.

As another example, the power supply unit 290 may be configured to recharge the battery in a wireless manner without use of the connection port. In this example, the power supply unit 290 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 12:
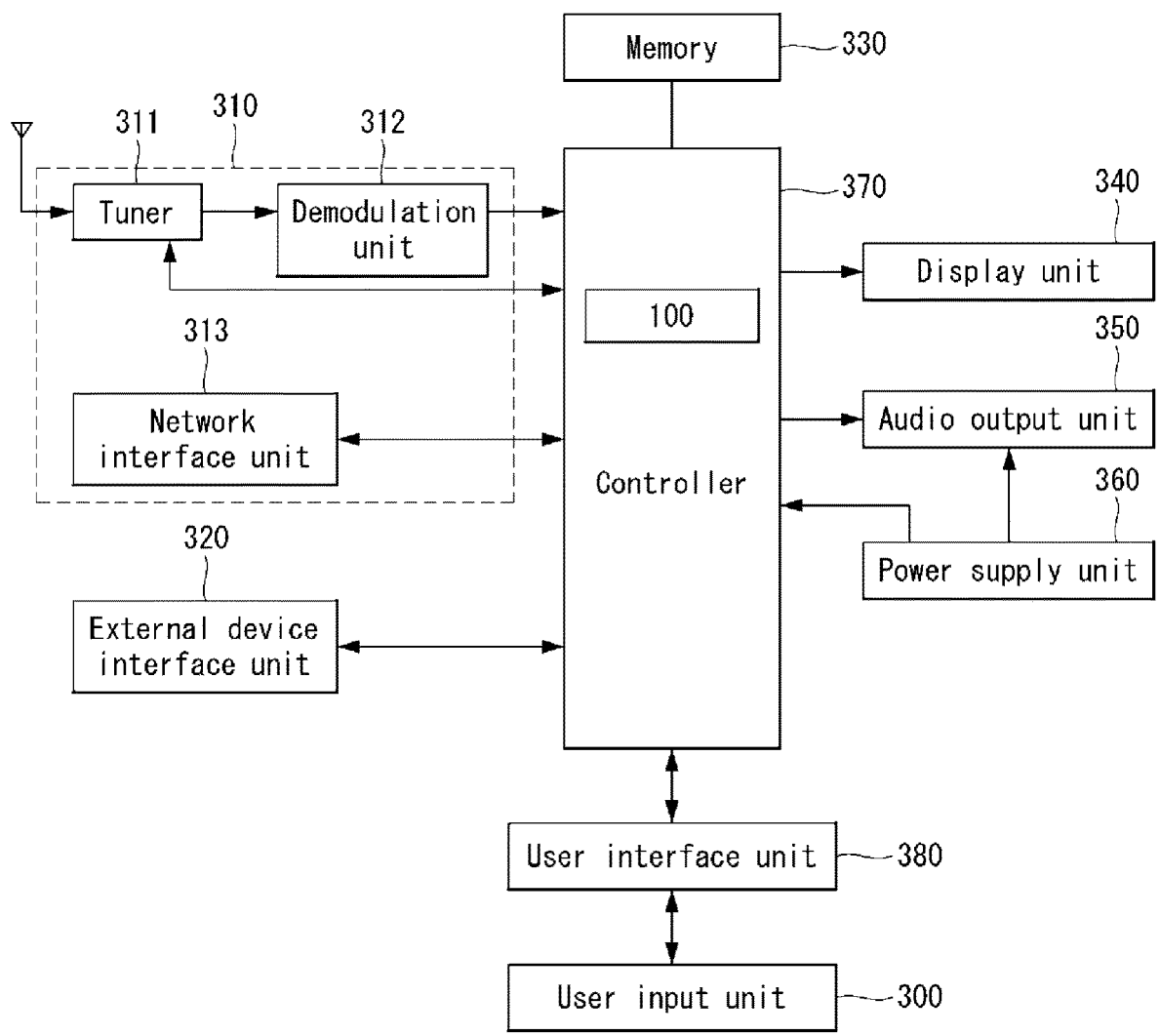
FIGS. 12 and 13 are block diagrams illustrating one example of a stationary display device.

FIG. 12 illustrates another configuration of a display device according to an exemplary embodiment of the invention. In the following description, the descriptions of the configuration and the structure described above are omitted. Hereinafter, a broadcasting signal receiver is used as an electronic device, to which the display device according to the embodiment of the invention is applied. The display device according to the embodiment of the invention may be applied to other electronic devices such as cell phones.

A display unit 340 shown in FIG. 12 may correspond to the display device shown in FIGS. 1 to 11. Thus, the display device according to the embodiment of the invention may be referred to as the display unit 340 shown in FIG. 12.

As shown in FIG. 12, a broadcasting signal receiver 111 according to the embodiment of the invention may include a broadcasting receiving unit 3340, an external device interface 320, a storage unit 330, a user input interface 380, a controller 370, a display unit 340, an audio output unit 350, a power supply unit 360, and a photographing unit (not shown). The broadcasting receiving unit 3340 may include a tuner 311, a demodulator 312, and a network interface 313.

If necessary, the broadcasting signal receiver 111 may be designed so that it includes the tuner 311 and the demodulator 312 and does not include the network interface 313. On the contrary, the broadcasting signal receiver 111 may be designed so that it includes the network interface 313 and does not include the tuner 311 and the demodulator 312.

The tuner 311 tunes a radio frequency (RF) broadcasting signal, which corresponds to a channel selected by the user or all of previously stored channels, among RF broadcasting signals received through an antenna. Further, the tuner 311 converts the tuned RF broadcasting signal into a middle frequency signal, a base band image signal, or a voice signal.

The demodulator 312 receives a digital IF signal converted by the tuner 311 and performs a demodulating operation.

A stream signal output by the demodulator 312 may be input to the controller 370. The controller 370 performs demultiplexing, image/voice signal processing, etc. Then, the controller 370 outputs an image to the display unit 340 and outputs a voice to the audio output unit 350.

The external device interface 320 may connect an external device to the broadcasting signal receiver 111. For this, the external device interface 320 may include an audio-visual (AV) input/output unit (not shown) or a wireless communication unit (not shown).

The network interface 313 provides an interface for connecting the broadcasting signal receiver 360 to a wired/wireless network including an internet network.

The network interface 313 may correspond to the wireless communication unit, which was described in detail above.

The storage unit 330 may store a program for the signal processing of the controller 370 and the control operation of the controller 370 or may store the processed image signal, the processed voice signal, or a data signal.

The user input interface 380 may transfer the signal the user inputs to the controller 370, or may transfer the signal from the controller 370 to the user.

For example, the user input interface 380 may receive and process the control signal indicating the turn-on or turn-off operation, the channel selection, the screen setting, etc. from a remote controller 300 based on various communication manners such as a RF communication manner and an infrared communication manner. Alternatively, the user input interface 380 may operate so that the control signal from the controller 370 is transmitted to the remote controller 300.

For example, the user input interface 380 may transfer a control signal, which is input from a power key, a channel key, a volume key, a local key, etc., to the controller 370.

The controller 370 may perform the demultiplexing processing on the stream input through the tuner 311, the demodulator 312, or the external device interface 320 or may perform the processing of demultiplexed signals, thereby generating or outputting the signals for outputting the image or the voice.

The image signal processed by the controller 370 may be input to the display unit 340 and may display an image corresponding to the image signal. Further, the image signal processed by the controller 370 may be input to an external output device through the external device interface 320.

The voice signal processed by the controller 370 may be output to the audio output unit 350. Further, the voice signal processed by the controller 370 may be input to the external output device through the external device interface 320.

The controller 370 may control the entire operation of the broadcasting signal receiver 3400Q. For example, the controller 370 may control the tuner 311, so that the tuner 311 tunes a RF broadcasting signal corresponding to a channel selected by the user or a previously stored channel.

The controller 370 may control the broadcasting signal receiver 360 using a user command or an internal program input through the user input interface 380.

The display unit 340 may convert the image signal, the data signal, and an OSD signal, which are processed by the controller 370, or the image signal and the data signal which are received from the external device interface 320, into red, green, and blue signals and may generate a driving signal.

The audio output unit 350 may receive the voice signal (for example, stereo signal, 3.1 channel signal, or 5.1 channel signal) processed by the controller 370 and may output the voice.

The power supply unit 360 supplies the power required in all of the components of the broadcasting signal receiver 111.

The remote controller 300 transmits the user command the user inputs to the user input interface 380. For this, the remote controller 300 may use Bluetooth, RF communication, infrared communication, Ultra-wideband (UWB), Zigbee, etc.

The remote controller 300 may receive the image, the voice, or the data signal output from the user input interface 380 and may display the image, the voice, or the data signal or may output the voice or the vibration.

The broadcasting signal receiver 111 may not include the tuner 311 and the demodulator 312. Further, the broadcasting signal receiver 111 may receive image contents through the network interface 313 or the external device interface 320 and may reproduce the image contents.

Figure 13:
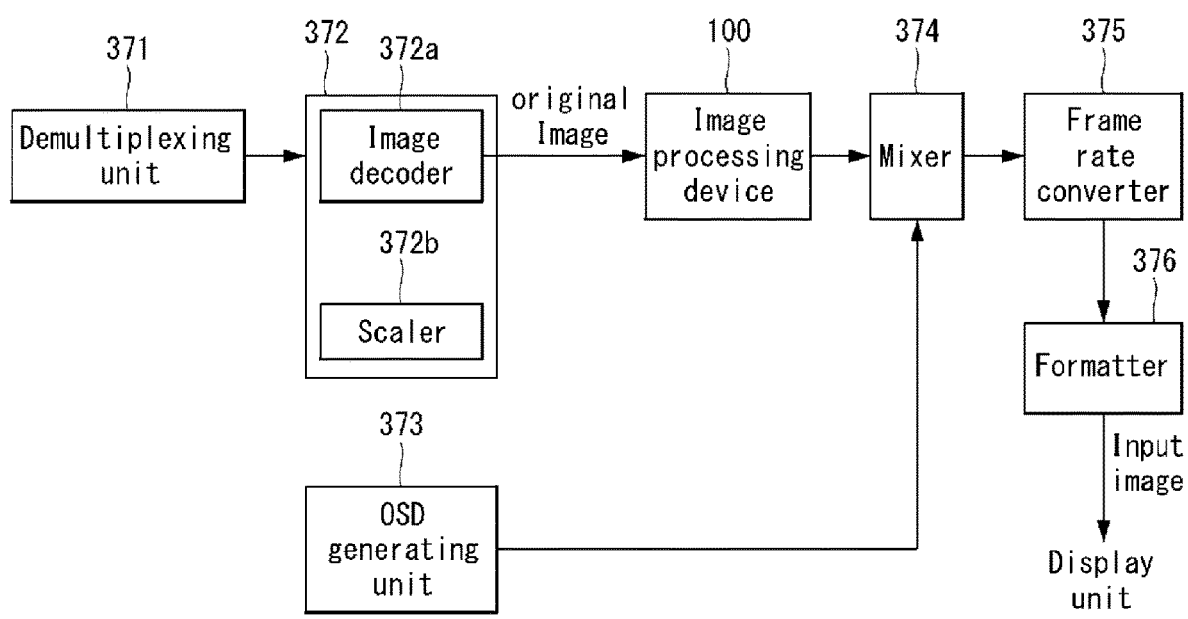

Referring to FIG. 13, the control unit 370 includes a demultiplexing unit 371, a decoding related unit 372, an on-screen display (OSD) generating unit 373, an image processing apparatus 100, a mixer 374, a frame rate converter (FRC) 375, a formatter 376, and the like. In addition, although not shown, the control unit 370 may further include a voice processing unit and a data processing unit.

The demultiplexer 371 demultiplexes the input stream. For example, the demultiplexer 371 can demultiplex the received MPEG-2 TS video, audio and data signals. Here, the stream signal input to the demultiplexer 371 may be a stream signal output from the tuner, demodulator, or external device interface.

The decoding related unit 372 decodes the demultiplexed video signal. To this end, the decoding related section 372 may include a video decoder 372a and a scaler 372b. The video signal decoded by the decoding related unit 372 may be input to the mixer 374. [

The video decoder 372a decodes the demultiplexed video signal. The scaler 372b scales the resolution of the decoded video signal so that it can be output from the display unit 340. The scaler 372b may be omitted because the image storage device 50 of the image processing apparatus 100 performs the scale function.

The video decoder 372a may support various standards. For example, the video decoder 372a performs the function of an MPEG-2 decoder when the video signal is encoded in the MPEG-2 standard, and the video decoder 372a encodes the video signal in the DMB (Digital Multimedia Broadcasting) It is possible to perform the function of the H.264 decoder. The original image signal output from the image decoder 372a may be supplied to the mixer 374 after being divided through the image processing apparatus 100.

The OSD generating unit 373 generates OSD data according to user input or itself. The OSD generating unit 155 generates data for displaying various data in the form of graphic or text on the screen of the display unit 340 based on the control signal of the user interface unit 380. [The generated OSD data includes various data such as a user interface screen (e.g., a GUI) of a display device, various menu screens, a widget, an icon, viewing rate information, and the like. The OSD generation unit 374 may generate data for displaying broadcast information based on the caption of the broadcast image or the EPG.

The mixer 374 mixes the OSD data generated by the OSD generator 155 and the processed image signal output from the image processing apparatus 100 and provides the mixed image to the formatter 376. Since the decoded video signal and the OSD data are mixed, the OSD is overlaid on the broadcast image or the external input image.

A frame rate conversion unit (FRC) 375 converts a frame rate of an input image. For example, the frame rate conversion unit 375 may convert the frame rate of the input 60 Hz image to have a frame rate of 120 Hz or 240 Hz according to the output frequency of the display unit 340, for example. As described above, there are various methods for converting the frame rate. For example, when the frame rate is converted from 60 Hz to 120 Hz, the frame rate conversion unit 375 may insert the same first frame between the first frame and the second frame, Three frames can be inserted. As another example, when converting the frame rate from 60 Hz to 240 Hz, the frame rate conversion unit 375 may insert and convert three or more identical frames or predicted frames between existing frames. If the frame conversion is not performed, the frame rate conversion unit 375 may be bypassed.

The formatter 376 changes the output of the input frame rate converter 375 to match the input signal format of the display unit 340. For example, the formatter 376 may output R, G, and B data signals and the R, G, and B data signals may be output as low voltage differential signals (LVDS) or mini-LVDS Can be. When the output of the input frame rate converter 375 is a 3D video signal, the formatter 376 forms and outputs the 3D signal in accordance with the input signal format of the display unit 340, May also support 3D services.

The voice processing unit (not shown) in the control unit 370 can perform the voice processing of the demultiplexed voice signal. Such a voice processing unit (not shown) can support processing various audio formats. For example, even when a voice signal is coded in a format of MPEG-2, MPEG-4, AAC, HE-AAC, AC-3, BSAC, etc., A voice processing unit (not shown) can process a base, a treble, a volume control, and the like.

A data processor (not shown) in the controller 370 can perform data processing of the demultiplexed data signal. For example, the data processing unit can decode the demultiplexed data signal even when it is coded. Here, the encoded data signal may be EPG information including broadcast information such as a start time and an end time of a broadcast program broadcasted on each channel.

Recently, the 8K ultra high definition (7680 pixels by 4320 lines) images are getting attention, the resolution of which has doubled both in the horizontal and vertical directions compared with that of the conventional ultra high definition image. To process 8K ultra high definition images, the hardware manufacturing process for display devices needs to be made more precise than the present process, and hardware capacity thereof needs to be enlarged.

If the hardware system of a display device has to be rebuilt each time a new input image format with resolution extended from that of the existing image format is introduced to deal with a faster clock and to store more image information, the overall cost and time for display devices may be increased.

Therefore, an object of the present invention is to provide a display device capable of processing an input image with resolution higher than that allowed for the display device without reconfiguring the hardware system thereof and an image processing method for the display device.

Technical objects to be achieved by the present invention are not limited to those described above. Other technical objects of the present invention may also be clearly understood from the descriptions given below by those skilled in the art to which the present invention belongs.

A display device according to an embodiment of the present invention includes an image processing unit dividing input image data with first resolution into image blocks with an acceptable size and generating processed image data with second resolution lower than the first resolution; an image storage unit resizing processed image data with the second resolution into output image data fitted to a screen; and a display unit displaying the output image data on the screen.

An image processing method for a display device according to an embodiment of the present invention includes image processing dividing input image data with first resolution into image blocks with an acceptable size and generating processed image data with second resolution lower than the first resolution; resizing processed image data with the second resolution into output image data fitted to a screen; and displaying the output image data on the screen.

The present invention divides input image data with first resolution into a plurality of blocks and processes image data of the plurality of blocks in parallel through a predetermined reference clock and storage space, thereby generating processed images data with second resolution lower than the first resolution. Since the present invention is capable of lowering an input video clock below the reference clock through data partitioning and parallel processing of partitioned data blocks while maintaining the reference clock and memory capacity, an input image with higher resolution than allowed may be processed easily without reconfiguring a hardware system.

In other words, when an extended ultra high definition image input whose resolution is higher than that allowed for a display device is applied, the present invention divides digital image information exceeding the capacity of the display device into blocks of appropriate sizes and processes the blocks in parallel. Therefore, the present invention may provide ultra high definition images while considerably reducing the amount of hardware required for processing an image input with excessive resolution and minimizing data loss at the same time.

Further scope of applicability of the present invention will become apparent from the detailed description given hereinafter. However, it should be understood that the detailed description and specific examples such as preferred embodiments of the present invention are given only for the purpose of illustration, since various changes and modifications within the spirit and scope of the invention will become apparent to those skilled in the art from this detailed description.

It will be apparent to those skilled in the art that various modifications and variations can be made in the present invention without departing from the spirit or scope of the invention. Therefore, the technical scope of the present invention should not be limited to the contents described in the detailed description of the specification, but should be defined by the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device, comprising:
an image processor configured to:
receive input image data having a first resolution,
separate the received input image data into a plurality of image blocks, and
provide, from the plurality of blocks, processed image data having a second resolution, wherein the second resolution is less than the first resolution;
an image storage device to resize the processed image data having the second resolution into output image data corresponding to resolution of a screen of the display device; and a display to display, on the screen, the output image data,
wherein the image processor is further configured to:
process, in parallel, the image data separated into the plurality of blocks based on a predetermined reference clock corresponding to the second resolution, and provide the processed image data having the second resolution,
wherein the first resolution is M×N (where M and N are natural numbers), and the second resolution is (M/2)×(N/2), where M represents a number of unit pixels arranged along a horizontal direction on the screen, and N represents a number of pixel lines arranged along a vertical direction on the screen,
wherein the image processor comprises:
an image distributing device to duplicate the input image data and provide four distributed image data having M×N resolution;
a first, a second, a third, and fourth image cropping device to crop a predetermined amount of data from each of the four distributed image data;
a first, a second, a third, and a fourth clock changing device to provide first, second, third, and fourth block image data, each having M/4×N resolution, by changing image data received from the first to the fourth image cropping device based on a predetermined reference clock.

2. The display device of claim 1, wherein the image processor is configured to:
control a horizontal digital filter to reduce horizontal resolution of the image data separated into the plurality of blocks by half, and
control a vertical digital filter to reduce vertical resolution of the image data separated into the plurality of blocks by half.

3. The display device of claim 2, wherein the image processor is configured to determine equalization coefficients based on part of image data of neighbor blocks and arbitrary first dummy data.

4. The display device of claim 3, wherein the image processor is configured to store, in a line memory, image data of each of the plurality of blocks and part of image data of the neighbor blocks.

5. The display device of claim 3, wherein the image processor is configured to provide the arbitrary first dummy data by duplicating first and last pixel data of the image data separated into the plurality of blocks.

6. The display device of claim 3, wherein the image processor is configured to determine equalization coefficients based on arbitrary second dummy data.

7. The display device of claim 6, wherein the image processor is configured to provide the arbitrary second dummy data by duplicating first and last line data of the image data separated into the plurality of blocks.

8. The display device of claim 2, wherein the horizontal digital filter includes a finite impulse response digital filter, and the vertical digital filter includes a finite impulse response digital filter.

9. The display device of claim 1, wherein the image processor further comprises:
a first horizontal filter and a second horizontal filter that reduce, by a horizontal digital filter, horizontal resolution of the first to the fourth block image data by half and provide a fifth to an eighth block image data, each having M/8×N resolution; and
a vertical filter that reduces, by a vertical digital filter, vertical resolution of the fifth to the eighth block image data by half and provide processed image data having (M/2)×(N/2) resolution.

10. The display device of claim 9, wherein the first horizontal filter is configured to:
couple to outputs of the first and the second clock changing devices for processing boundary area among the first to the third block image data,
store, in a first line memory, the first and the second block image data,
couple to output of the third clock changing device, and
store, in the first line memory, part of the third block image data.

11. The display device of claim 10, wherein the second horizontal filter is configured to:
couple to outputs of the third and the fourth clock changing devices for processing boundary area among the second to the fourth block image data,
store, in a second line memory, the third and the fourth block image data,
couple to the output of the second clock changing device, and
store, in the second line memory, part of the second block image data.

12. The display device of claim 10, wherein the first horizontal filter is configured to process the boundary area based on part of image data of neighbor blocks.

13. The display device of claim 9, wherein the first and the second horizontal filters are configured to duplicate first and last pixel data of the first to the fourth block image data and to determine equalization coefficients of the first and the last pixel databased on the duplicated pixel data.

14. The display device of claim 9, wherein the vertical filter is configured to duplicate first and last line data of the fifth to the eighth block image data and to determine equalization coefficients of the first and the last line databased on the duplicated line data.

15. An image processing method for a display device, comprising:
separating input image data having a first resolution into a plurality of image blocks,
providing, from the plurality of image blocks, processed image data having a second resolution, wherein the second resolution is less than the first resolution;
resizing the processed image data having the second resolution into output image data corresponding to resolution of a screen; and
displaying, on the screen, the output image data,
wherein the separating and the providing of the processing image data includes processing, in parallel, image data separated into the plurality of blocks based on predetermined reference clock corresponding to the second resolution and providing the processed image data having the second resolution,
wherein the first resolution is M×N (where M and N are natural numbers), and the second resolution is (M/2)×(N/2), where M represents a number of unit pixels arranged along a horizontal direction on the screen, and N represents a number of pixel lines arranged along a vertical direction on the screen,
wherein the separating and the providing of the processing image data having the second resolution includes:
duplicating, by an image distributing device, the input image data and provide four distributed image data having M×N resolution, cropping, by a first, a second, a third, and fourth image cropping device, a predetermined amount of data each of the four distributed image data, providing, by a first, a second, a third, and a fourth clock changing device, the first, second, third, and fourth block image data, each having M/4×N resolution, by changing image data received from the first to the fourth image cropping device based on a predetermined reference clock.

16. The method of claim 15, wherein providing the processed image data having the second resolution includes reducing, by a horizontal digital filter, horizontal resolution of the image data separated into the plurality of blocks by half and reducing, by a vertical digital filter, vertical resolution of the image data separated into the plurality of blocks by half.

17. The method of claim 16, comprising determining equalization coefficients based on the image data of neighbor blocks and arbitrary dummy data.

\* \* \* \* \*